United States Patent [19]

Desplanches et al.

[11] 4,068,048
[45] Jan. 10, 1978

[54] METHOD FOR PREPARING ALKALINE BETA ALUMINA PARTS

[75] Inventors: Gérard Desplanches, Villejust; Yvon Lazennec, St Michel sur Orge; Jacques Leboucq, Ste Genevieve des Bois, all of France

[73] Assignee: Compagnie Generale d'Electricite S.A., Paris, France

[21] Appl. No.: 668,998

[22] Filed: Mar. 22, 1976

[30] Foreign Application Priority Data

Mar. 20, 1975 France .................................. 75.08766
July 24, 1975 France .................................. 75.23165

[51] Int. Cl.² ..................... C04B 35/10; C04B 35/44; F27B 9/14
[52] U.S. Cl. ........................................ 429/193; 106/65; 106/73.4; 264/58; 264/65; 423/600
[58] Field of Search .......................... 106/65; 423/600; 429/193; 264/65, 58

[56] References Cited

U.S. PATENT DOCUMENTS

| | | | |
|---|---|---|---|
| 2,043,029 | 6/1936 | Blau et al. | 106/65 |
| 2,948,949 | 8/1960 | Schüffler et al. | 264/58 |
| 3,743,543 | 7/1973 | Chiku et al. | 136/6 FS |
| 3,795,723 | 3/1974 | Clewdenen | 136/153 |
| 3,859,427 | 1/1975 | Francis et al. | 106/65 |
| 3,875,277 | 4/1975 | Bratton et al. | 106/65 |
| 3,895,963 | 7/1975 | McGowan et al. | 429/193 |
| 3,903,225 | 9/1975 | Jones et al. | 106/65 |
| 3,950,463 | 4/1976 | Jones | 429/193 |
| 3,959,022 | 5/1976 | De Jonghe et al. | 429/193 |

OTHER PUBLICATIONS

DeVries, R. C. et al. - "Critical Evaluation of the Literature Data on Beta Alumina and Related Phases-I, Phase Equilibria and Characterization of Beta Alumina Phases" - J. Am. Cer. Soc. 52 (7) pp. 364–369.

Primary Examiner—Helen M. McCarthy
Attorney, Agent, or Firm—Sughrue, Rothwell, Mion; Zinn and Macpeak

[57] ABSTRACT

Method for manufacturing alkaline beta alumina parts, consisting in heating a mixture of alumina and of sodium carbonate, in crushing the powder obtained, in shaping the parts, in sintering them at 1650° C, those parts being arranged in a sintering enclosure suitable for creating, in the vicinity of the parts, an atmosphere which is rich in sodium. The invention is implemented in the embodiment of an electrolyte for sodium-sulphur cells.

8 Claims, 7 Drawing Figures

METHOD FOR PREPARING ALKALINE BETA ALUMINA PARTS

The present invention has as its object a method for preparing alkaline beta alumina parts and more particularly sodium beta alumina parts.

It is known that great applications can be found at present for alkaline beta alumina and more particularly beta sodium alumina as a solid electrolyte in electrochemical cells such as sodium sulphur cells.

A known method for preparing beta sodium alumina having a formula of $xAl_2O_3$, $Na_2O$ consists, for example, in effecting, at a temperature comprised between 1850° and 2000° C, the melting of a mixture of alpha or gamma alumina and of sodium carbonate in such proportions that $x$ be comprised between 5 and 11. The alumina thus obtained is broken up and crushed until the required granulometry is obtained.

For that purpose, the block of alumina obtained is crushed during 24 hours, approximately by means of steel balls in a stainless steel jar.

A part of the iron which is contingently inserted during the crushing operation is removed by magnetic sorting, the remainder being removed by corroding with hydrochloric acid.

After washing, rinsing, drying, beta alumina powder whose grains can have dimensions in the order of a few microns is obtained.

Beta alumina powder is then shaped with a view to its use as an electrolyte.

In the case where it is required to form a tube, it is an advantage to proceed as follows:

In a first phase, the powder is deposited on a mandrel, for example by electrophoresis or spraying with a gun, after putting into suspension in an organic solvent contingently containing a binding agent. Then, an isostatic compression of the deposit thus formed is effected.

After stripping, sintering in air is effected, for example in a gas furnace, at a temperature in the order of 1800° to 1900° C for about 4 hours.

The rise in temperature up to that sintering temperature is rapid. It can be effected in 3 hours. Rapid cooling is also effected.

In this way, it is possible to obtain tubes having a thickness comprised between 200 and 600 microns and whose walls are very fluid-tight, the said tubes being suitable for use as solid electrolytes.

Nevertheless, such methods have a certain number of disadvantages. One of these disadvantages results from the fact that the crushing times are long and that it is necessary to effect a purifying of the product obtained as stated hereinabove.

Another disadvantage results from the fact that subsequent to the use of high sintering temperatures, there occurs a great loss of sodium in the beta sodium alumina parts, this leading, more particularly, to a certain dispersion of the properties between different batches of sintered parts.

The present invention makes it possible to overcome those major disadvantages and it has as its object a method enabling the easy preparing of the alkaline beta alumina and more particularly of the beta sodium alumina having compositions and properties which are very reproducible, such a method being simple to implement at a moderate cost price.

The invention therefore has as its object a method for preparing alkaline beta alumina parts, in which the following successive phases are carried out:

A. A close mixture of alumina powder and alkaline carbonate powder, more particularly sodium carbonate powder is formed in respective quantities such that a predetermined ratio of $Al_2O_3/Na_2O$ be obtained;

B. The said close mixture is heated in an open crucible;

C. The said mixture is allowed to cool freely;

D. The powder thus obtained is crushed;

E. The shaping of the said parts is effected;

F. The sintering of these latter is effected;

A method in which the said sintering is effected by arranging the said parts in a sintering enclosure, suitable for creating, during the operation and in the immediate vicinity of the parts, an atmosphere which is rich in sodium, the said enclosure being heated to a temperature comprised between 1600°0 and 1700°, maintained for 30 minutes to 4 hours, then being cooled freely down to ambient temperature, that method being characterized in that the said sintering enclosure comprises a body suitable for receiving the said parts stopped up at its ends by means of a top plate and a bottom plate, each of the said plates comprising a hollowed out part filled with the said alkaline carbonate, the said bottom plate resting on a bottom, the said top plate being stopped up by means of a cover.

According to one method of embodiment, the said body has a shape which is preferably tubular, the said parts being arranged inside the body on chocks made of the said alkaline beta alumina, the hollowed out part of the said top plate being arranged at the upper part of the latter with respect to the said cover, the hollowed out part of the said bottom plate also being arranged at the top part of the latter with respect to the said body.

According to another embodiment, the said body comprises alveoli opening out at its ends and accomodating the said parts arranged bearing against the said bottom plate, the hollowed out part of the said top plate being arranged at the upper part of the latter with respect to the said cover, the hollowed out part of the said bottom plate being arranged at the lower part of the latter with respect to the said bottom and communicating with each of the said alveoli by means of a channel opening out into the inside part of each of the parts.

In these two embodiments, the sintering assembly is entirely made of the said alkaline beta alumina.

According to yet another embodiment, the said sintering enclosure is made of a refractory material preferably chosen from the group formed by alpha alumina, carborundum (silicon carbide) zirconia and it comprises a body suitable for accomodating the said parts, stopped up at its ends by means of a top plate and a bottom plate, each of the said plates comprising a hollowed out part filled with the said alkaline carbonate, the said bottom plate resting on the bottom, the said top plate being stopped up by means of a cover, the said body having a preferably tubular shape, the said parts being arranged inside the body on chocks made of alkaline beta alumina, the hollowd out part of the said top plate being arranged at the upper part of the latter, facing the said cover, the hollowed out part of the said bottom plate also being arranged at the upper part of the latter, facing the said body, the said hollowed out part of the said top plate communicating with the inside of the said body by means of channels formed in the said top plate, the said channels opening out into the said hollowed out part of the top plate by means of parts in relief, the alkaline carbonate being spread round the said parts in relief.

Other characteristics and the advantages of the invention will become apparent from the following description given by way of an illustrating example and having no limiting character, with reference to the accompanying drawings, in which.

Firstly, powders of alpha or gamma alumina and of sodium carbonate are closely mixed together in respective quantities such that beta alumina $xAl_2O_3$, $Na_2O$, with $x$ comprised between 5 and 11, is obtained.

Such a mixture is arranged in an open crucible in such a way that the reaction takes place in an open atmosphere.

The said crucible is inserted in a furnace and brought to a temperature comprised between 1150° and 1300°, for example 1200°, maintained for 1 to 5 hours, for example.

At the end of the heating time, the crucible is allowed to cool freely. The beta sodium alumina thus obtained in the form of powder is then crushed for about 30 minutes and passed through a sieve.

The shaping of the parts, for example, of tubes, is then effected, this being done by electrophoresis and isostatic compression of the deposit obtained.

Figure 1:
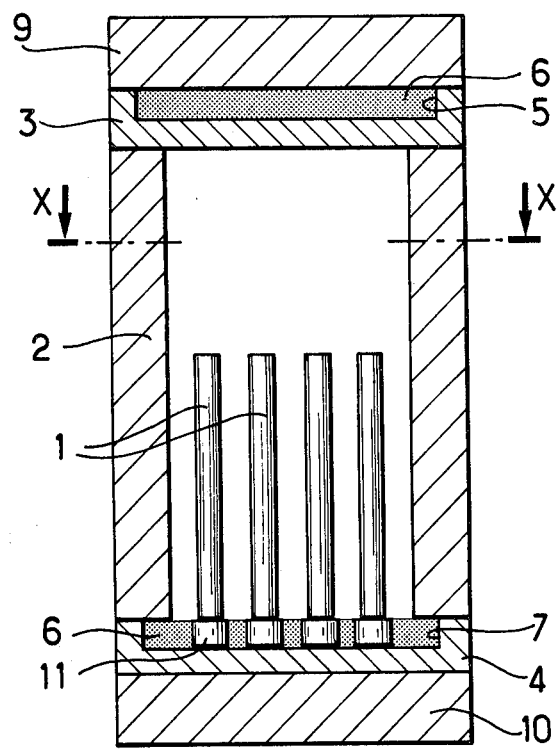
FIG. 1 is a longitudinal cross-section view of a first embodiment of a sintering enclosure for implementing the method according to the invention.
Figure 2:
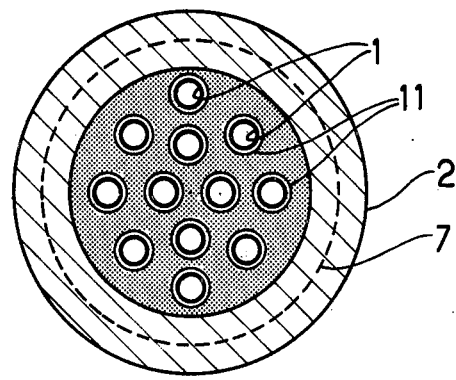
FIG. 2 is a cross-section through the axis XX in FIG. 1.

According to the invention, the sintering is effected as follows:

With reference to FIGS. 1 and 2, the tubes 1 of beta sodium alumina shaped as previously described are inserted in a sintering enclosure which is made entirely of beta sodium alumina. That enclosure comprises, in a first embodiment, a tubular body 2, stopped up at its ends by a top plate 3 and a bottom plate 4. The top plate 3 comprises a circular hollowed out part 5 at its upper part, filled with sodium carbonate powder or grains 6. Likewise, the bottom plate 4 also comprises, at its upper part, a hollowed out part 7 filled in a like manner with sodium carbonate powder or grains 6. The assembly is stopped up by a cover 9 and rests on a bottom 10. The said tubes 1 rest on chocks 11 made of beta sodium alumina.

Figure 3:
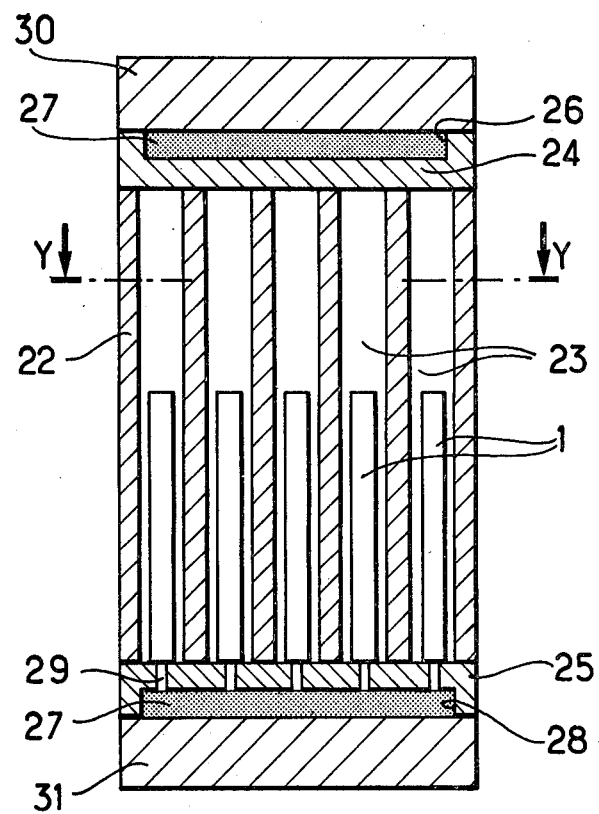
FIG. 3 is a longitudinal cross-section of a second embodiment of a sintering enclosure for implementing the method according to the invention.
Figure 4:
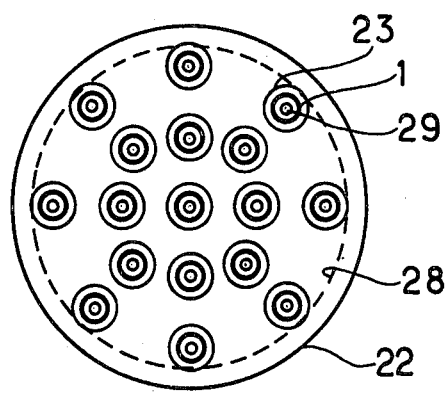
FIG. 4 is a cross-section through the axis YY in FIG. 3.

With reference to FIGS. 3 and 4, the tubes 1 of beta sodium alumina shaped as previously described are inserted in a sintering enclosure also made of beta sodium alumina, which, according to a second embodiment, comprises a body 22 which is, for example, cylindrical, perforated with alveoli 23 which are, for example, cylindrical, the said body being stopped up at its ends by means of a top plate 24 and a bottom plate 25, on which the tubes 1 rest.

The top plate 24 comprises a circular hollowed out part 26 at its upper part, filled with sodium carbonate powder or grains 27. Likewise, the bottom plate 25 comprises, at its lower part, a hollowed out part 28 filled in a like way with sodium carbonate powder or grains 27. Moreover, each of the alveoli 23 communicates with the hollowed out part 28 of the plate 25 by means of a channel 29 opening out inside the part 1. The assembly is stopped up by a cover 30 and rests on a bottom 31.

Whatever the mode of embodiment chosen, the enclosure is inserted in a furnace where the sintering of the parts 1 is effected. For that purpose, the temperature is raised to 1650° C and maintained for 1½ hours, such operating conditions varying, contingently, between 30 minutes and 4 hours inasmuch as concerns time and between 1600° and 1700° inasmuch as concerns temperature. The speed of the rise in temperature is in the order of 3 hours. Then the furnace is allowed to cool freely.

Figure 5:
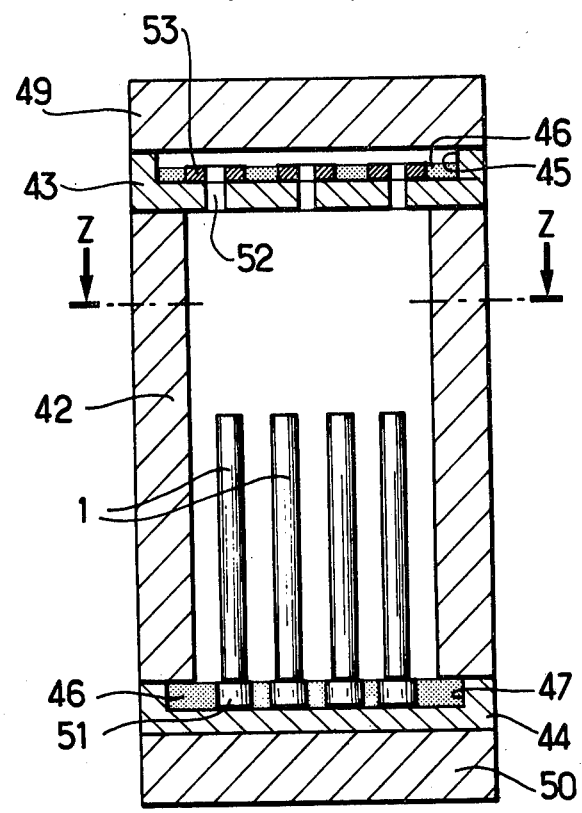
FIG. 5 is a longitudinal cross-section of a third embodiment of a sintering enclosure for implementing the method according to the invention.
Figure 6:
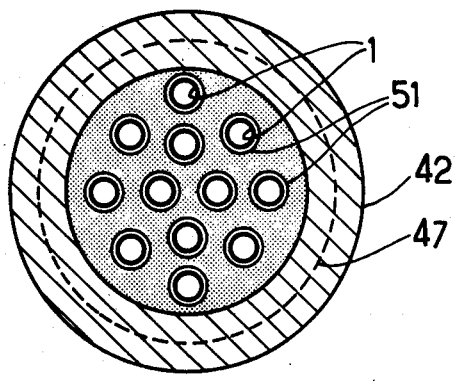
FIG. 6 is a cross-section through the axis ZZ in FIG. 5.
Figure 7:
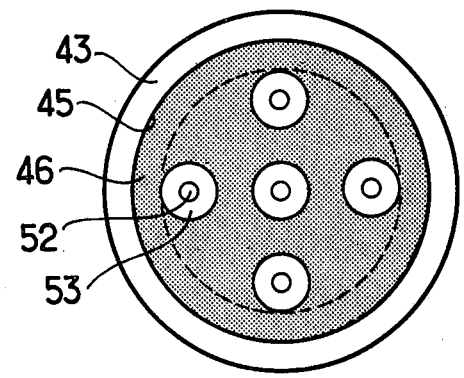
FIG. 7 is a top view of the said sintering enclosre whose cover has, it is assumed, been removed.

With reference to FIGS. 5 and 7, the tubes 1 of beta sodium alumina which are prepared and shaped as previously described are inserted in a sintering enclosure made entirely, in the third embodiment, either of alpha alumina or of carborundum, or of zirconia, or of any other refractory material. That enclosure comprises a tubular body 42, stopped up at its ends by a top plate 43 and a bottom plate 44. The top plate 43 comprises a circular hollowed out part 45 at its upper part in which sodium carbonate powder or grains 46 are inserted. Likewise, the bottom plate 44 comprises, also, at its upper part, a hollowed out part 47 filled with sodium carbonate powder or grains 46. The assembly is stopped up by a cover 49 and rests on a bottom 50. The said tubes 1 rest on chocks 51 made of beta sodium alumina.

According to that embodiment, the hollowed out part 45 of the top plate 43 communicates with the inside of the body 42 by means of channels such as 52. The channels 52 open out, moreover, into the hollowed out part 45 through the parts in relief 53 intended for preventing the sodium carbonate 46 spread in the hollowed out part 45 round those parts in relief from falling in the body 42.

The enclosure is therefore inserted in a furnace where the sintering of the parts 1 is effected. For that purpose, as in the preceding cases, the temperature is raised to 1650° C and maintained for 1½ hours, such operating conditions contingently varying, moreover, between 30 minutes and 4 hours, inasmuch as concerns time and between 1600° and 1700° C inasmuch as concerns temperature. The rising time of the temperature is in the order of 3 hours. Then the furnace is allowed to cool freely.

Whatever the embodiment chosen may be, the advantages of such a method are as follows:

In the first instance, the implementing of sources or tanks of sodium carbonate in the sintering enclosures makes it possible to create, in the vicinity of the parts 1 to be sintered, an atmosphere which is rich in sodium, suitable for compensating all contingent losses of the parts in that element.

The parts obtained in this way have a composition and properties which are constant and very reproducible, even from one sintering batch to another.

Moreover, the use of such a relatively low sintering temperature ensures, on the one hand, great saving of energy and, on the other hand, a remarkable service life of the sintering enclosures, which can therefore be used for a great number of operations.

It must be understood that the invention is in no way limited to the embodiments described and illustrated, but on the contrary, it covers all the variations therein.

We claim:

1. Method for preparing beta sodium alumina parts, suitable for use as solid electrolytes, in which the following successive steps are carried out:
   A. an intimate mixture of alumina powder and sodium carbonate powder is formed in respective quantities such that a predetermined ratio of $Al_2O_3/Na_2O$ of between 5 and 11 is obtained;
   B. the said intimate mixture is heated in an open crucible at 1150° to 1300° C for 1 to 5 hours;
   C. the said mixture is allowed to cool freely;
   D. the beta sodium alumina powder thus obtained is crushed;
   E. the shaping of said powder into the said parts is effected;
   F. the sintering of said parts is effected by arranging the said parts in a sintering enclosure, suitable for creating, during the sintering operation and in the immediate vicinity of the parts, an atmosphere which is rich in sodium, the said enclosure being heated to a temperature comprised between 160° and 1700° C, maintained for 30 minutes to 4 hours, then being cooled freely down to ambient temperature, wherein said sintering enclosure comprises a body suitable for accommodating the said parts, said body being closed at its ends by means of a top plate and a bottom plate, each of said plates comprising a hollowed out portion filled with sodium carbonate, the said bottom plate resting on a bottom, the said top plate being covered by means of a cover, and wherein at least one of said hollowed out portions is in communication with the interior of said body, and wherein the body of the sintering enclosure is made entirely of beta sodium alumina or said parts are arranged inside the body on chocks made of beta sodium alumina.

2. Method according to claim 1, characterized in that the said body has a shape which is tubular, the said parts, being arranged inside the body on chocks made of the said beta sodium alumina, the hollowed out portion of the said top plate being arranged at the upper part of the latter with respect to the said cover, the hollowed out portion of the said bottom plate also being arranged at the top part of the latter with respect to the said body.

3. Method according to claim 1 characterized in that the said body comprises compartments open at their ends and accomodating the said parts arranged bearing against the bottom plate, the hollowed out portion of the top plate being arranged at the upper part of the top plate with respect to the cover, the hollowed out portion of the bottom plate being arranged at the lower part of the bottom plate with respect to the bottom and the hollowed out portion of the bottom plate communicating with each of said compartments by means of channels formed in said bottom plate.

4. Method according to claim 1, characterized in that the said sintering enclosure is entirely made of the said sodium beta alumina.

5. Method according to claim 1, characterized in that the said sintering enclosure is made of a refractory material chosen from the group formed by alpha alumina, silicon carbide and zirconia.

6. Method according to claim 5 characterized in that the said sintering enclosure comprises a body suitable for accomodating the said parts, said body being closed at its ends by means of a top plate and a bottom plate, each of said plates comprising a hollowed out portion filled with sodium carbonate, the bottom plate resting on a bottom, the top plate being covered by means of a cover, the body having a tubular shape, the parts being arranged inside the body on chocks made of sodium beta alumina, the hollowed out portion of the top plate being arranged at the upper part of the top plate facing the cover, the hollowed out portion of the bottom plate being arranged at the upper part of the bottom plate and in communication with the inside of the body, the hollowed out portion of the top plate communicating with the inside of the body by means of channels formed thru said top plate.

7. Method according to claim 6, characterized in that the said channels open out into the said hollowed out part of the top plate by means of parts in relief, the sodium carbonate being spread round the said parts in relief.

8. Method according to claim 1, characterized in that in E), the shaping of the powder is effected by electrophoresis followed by an isostatic compression of the deposit thus obtained.

* * * * *